(12) United States Patent
Alhussaini et al.

(10) Patent No.: US 10,732,031 B2
(45) Date of Patent: Aug. 4, 2020

(54) REFLECTIVE LIGHT COLLECTING ENCLOSURE FOR A LIGHT METER

(71) Applicants: King Abdulaziz City for Science and Technology, Riyadh (SA); Fraunhofer Institute for Silicate Research ISC, Wurzburg (DE)

(72) Inventors: Mohammed I Alhussaini, Riyadh (SA); Mohammed A Bahattab, Riyadh (SA); Mark Mirza, Wurzburg (DE); Walther Glaubitt, Wurzburg (DE); Ibrahim A Alhomoudi, Riyadh (SA)

(73) Assignee: KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 64 days.

(21) Appl. No.: 14/956,409

(22) Filed: Dec. 2, 2015

(65) Prior Publication Data
US 2017/0160128 A1    Jun. 8, 2017

(51) Int. Cl.
*G01J 1/42* (2006.01)
*G01J 1/02* (2006.01)
*G01J 1/04* (2006.01)
*G01J 1/44* (2006.01)

(52) U.S. Cl.
CPC .......... *G01J 1/4204* (2013.01); *G01J 1/0271* (2013.01); *G01J 1/0474* (2013.01); *G01J 1/44* (2013.01); *G01J 2001/4266* (2013.01)

(58) Field of Classification Search
CPC ...... G01J 1/0271; G01J 1/0474; G01J 1/4204; G01J 1/44; G01J 2001/4266
See application file for complete search history.

(56) References Cited

U.S. PATENT DOCUMENTS

| 5,471,053 A | * | 11/1995 | Diner | G01J 1/04 250/228 |
| 9,318,636 B2 | * | 4/2016 | Badahdah | H01L 31/0543 |
| 2006/0131476 A1 | * | 6/2006 | Jeitner | G01J 1/04 250/203.4 |

* cited by examiner

*Primary Examiner* — Tony Ko
(74) *Attorney, Agent, or Firm* — Steven M. Shape; Dennemeyer & Associates, LLC

(57) ABSTRACT

The invention provides an illumination measuring module which includes a housing and a photo detector. The housing is molded with a plurality of surfaces. Each surface of the housing is affixed with respective side edges of the plurality of the surfaces to form a predetermined shape. Each surface includes an external surface and an inner surface. One surface of the plurality of surfaces is a glass surface. The glass surface transmits illumination collected from an external ambience of the housing to one or more inner surfaces corresponding to the plurality of surfaces. On an inner surface of the glass surface, a plane white sheet is positioned which homogenously scatters illumination collected from the external ambience into the one or more inner surfaces in the housing. The photo detector measures scattered illumination diffused from the one or more inner surfaces corresponding to the plurality of surfaces.

7 Claims, 5 Drawing Sheets

REFLECTIVE LIGHT COLLECTING ENCLOSURE FOR A LIGHT METER

FIELD OF THE INVENTION

The invention generally relates to the field of illumination measurement. More specifically, the invention relates to an illumination measuring module for accurately measuring illumination.

BACKGROUND OF THE INVENTION

Generally, a light sensitive component in an illuminance meter uses a silicon diode with filters for light-measuring levels ranging from 0.1 Lux to 200,000 Lux. The illuminance meter was used very well in diffuse light conditions. However, for measurements in direct sunlight, there are very large differences depending on the angle of a photo detector. If the angle of the photo detector is changed by 1 degree at clear sky conditions towards the direction of the sun, measured values may differ from each other by more than one order of a magnitude. Therefore, reproducible measurements of the direct radiation are impossible if the angle, at which the illumination is measured, cannot be complied precisely.

Usual illuminance meters are mostly used for indoor purposes at typical lighting conditions between 100 and 2000 Lux. The maximum factor for such light conditions indoors is 20. For such lighting conditions, constructions of commercial photo detectors are designed. The housing of such photo detectors are made of plastic and are very light. If measurements are carried out directly behind a glass of a window, a factor is taken into account, which is at least ten times higher than normal indoor measurements. If there is a slight deviation at a measuring point, in particular with regard to a setting angle, then the measurement results are affected dramatically. With the commercial design of photo detectors, the measurements may not be carried out satisfactorily. The low weight of the photo detectors in addition to an only millimeter-wide supporting surface of the photo detector may slip very slightly. Due to slipping, there could be a change in the setting angle with respect to the direct rays of the sun. Accordingly, the measurements may have a very high margin of error and may become useless for valid evaluations.

Thus, there is a need for an improved illumination measuring device to enable precise measurements of the incident light even under direct sunlight.

BRIEF DESCRIPTION OF THE FIGURES

The accompanying figures together with the detailed description below forms part of the specification and serves to further illustrate various embodiments and to explain various principles and advantages all in accordance with the invention.

DETAILED DESCRIPTION OF THE INVENTION

Figure 1:
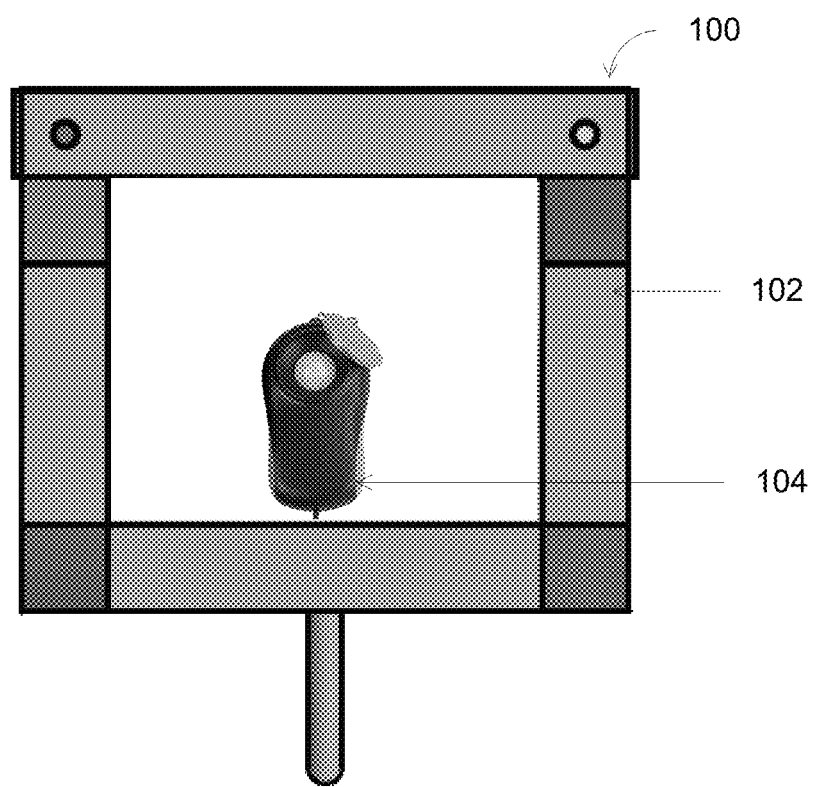
FIG. 1 illustrates a top view of an illumination measuring module in accordance with the embodiments of the invention.

Before describing in detail embodiments that are in accordance with the invention, it should be observed that the embodiments reside primarily in an illuminance measuring module. Accordingly, components of the well rescue device have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Generally speaking, pursuant to various embodiments, the invention provides an illumination measuring module. The illumination measuring module includes a housing and a photo detector. In accordance with various embodiments, the housing is molded with a plurality of surfaces. Each surface of the housing is affixed with respective side edges of the plurality of the surfaces to form a predetermined shape. Each surface includes an external surface and an inner surface. The inner surface includes a broader contact surface to avoid tilting of the photo detector mounted inside the housing.

One surface of the plurality of surfaces is a glass surface. The glass surface transmits illumination collected from an external ambience of the housing to one or more inner surface corresponding to the plurality of surfaces. In an embodiment, the glass surface is surrounded with a supporting surface using a foam rubber shape. On the inner surface of the glass surface, a plane white sheet is positioned. The plane white sheet homogenously scatters illumination collected from the external ambience of the housing into the one or more inner surfaces corresponding to the plurality of surfaces of the housing. The one or more of inner surfaces of the housing generates a plurality of reflections of the scattered illumination inside the housing.

In accordance with various embodiments, the photo detector is mounted inside the housing. The photo detector measures scattered illumination diffused from the one or more inner surfaces, whereby the illumination is collected from the external ambience of the housing is measured at one or more of inner surfaces of the housing to identify precise measurements of incident illumination under external ambience.

In an embodiment, the illumination measuring module is mounted on a glass pane to provide a secure arrangement of the illumination measuring module for measuring illumination collected from the external ambience of the housing. The glass pane is equipped with one of a coated glass and an uncoated glass positioned in one of an upright angle and tilted angle.

FIG. 1 illustrates a top view of an illumination measuring module 100 in accordance with the embodiments of the invention. Illumination measuring module 100 includes a housing 102 and a photo detector 104 shown in FIG. 1 (a top surface of housing 102 is not shown). Photo detector 104 is mounted inside housing 102. The shape of housing 102 is a rectangular cuboid shape. The rectangular cuboid shape is shown for explanation purpose. It will be apparent to a person skilled in the art that housing 102 can be of any other predetermined shapes such as, but not limited to, polyhedrons. The polyhedron includes, but is not limited to, tetrahedron, hexahedron, octahedron, dodecahedron, and icosahedron. The hexahedron such as, but not limited to, trapezoid, cube, rectangular cuboid, trigonal trapezohedron (rhombi or quadrilaterals), quadrilateral frustum, parallelepiped, three pairs of rhombi, triangular bipyramid, tetragonal antiwedge, pentagonal pyramid.

Figure 2:
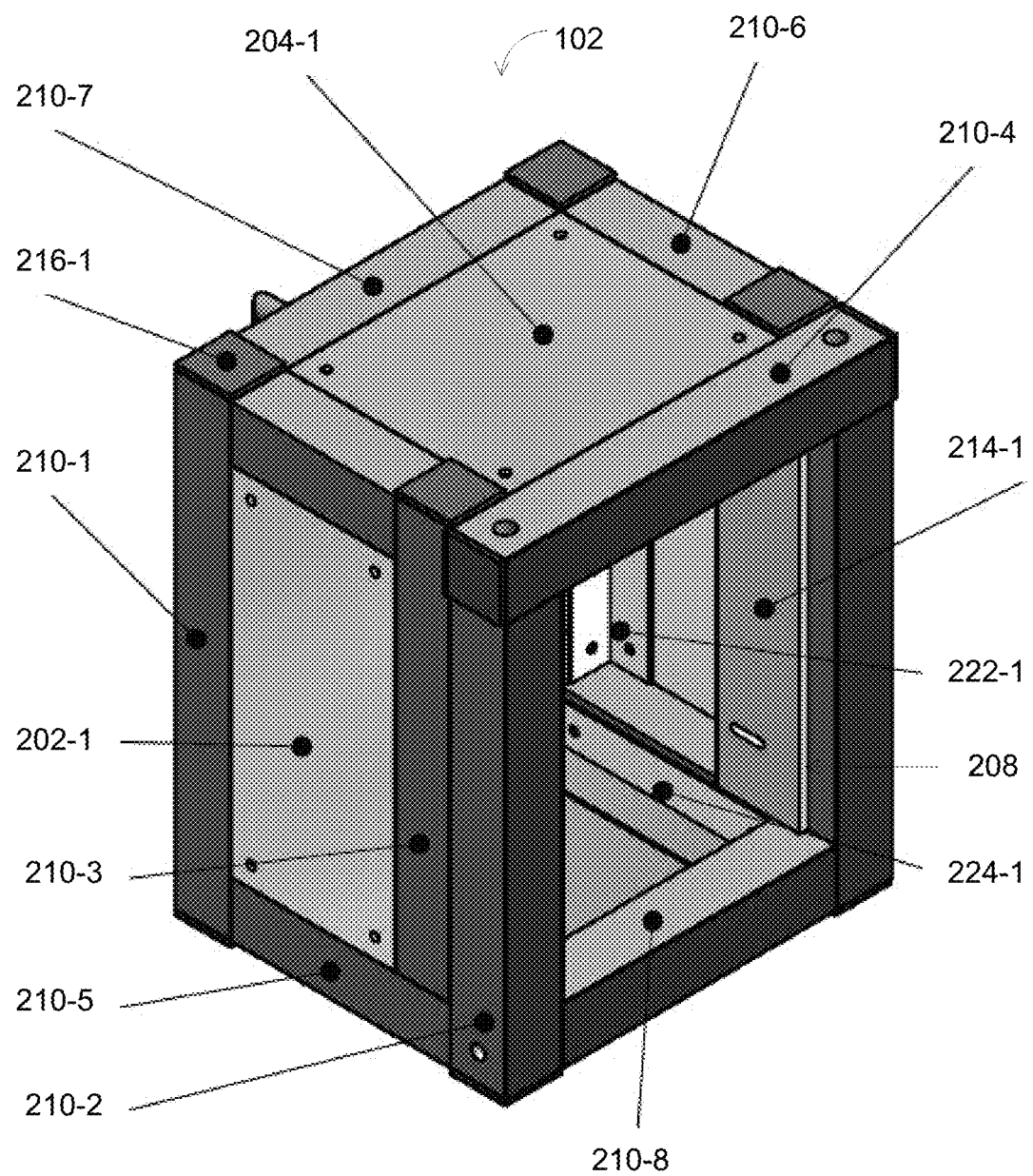
FIG. 2 illustrates a housing of the illumination measuring module in accordance with the embodiments of the invention.
Figure 3:
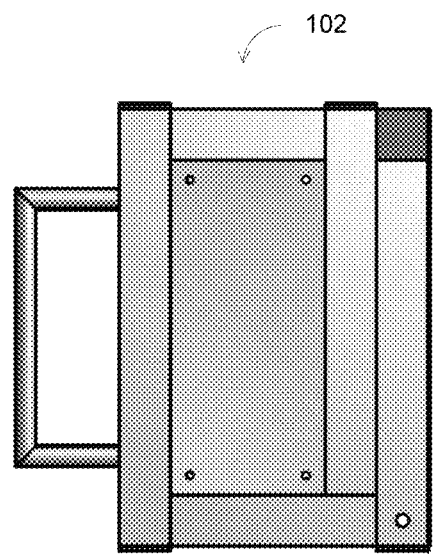
FIGS. 3, 4, 5 & 6 illustrates a side view, a front view, a back view, and a top view of housing respectively in accordance with an embodiment of the invention.
Figure 4:
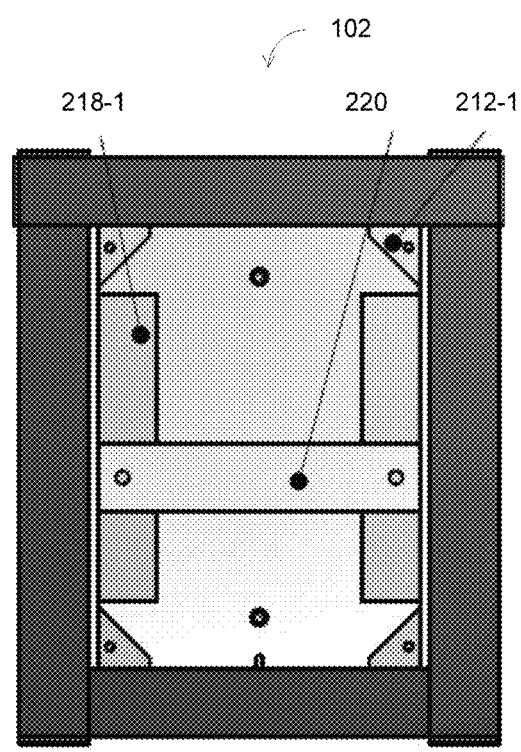
Figure 5:
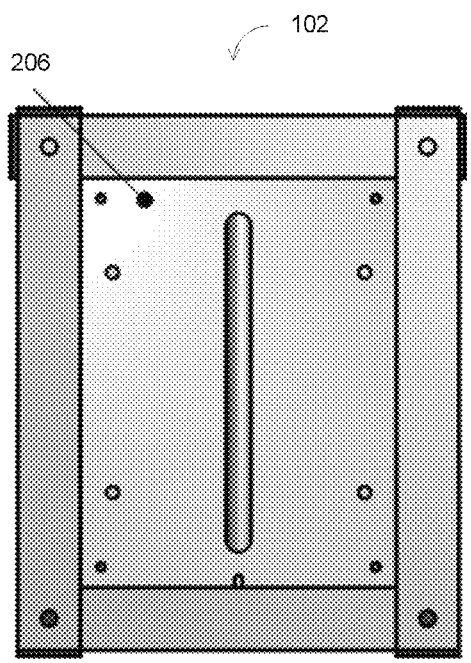
Figure 6:
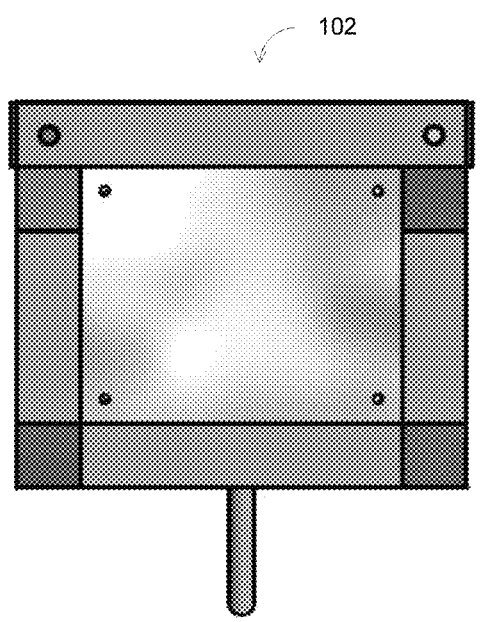

FIG. 2 illustrates housing 102 of illumination measuring module 100 in accordance with the embodiments of the invention. FIGS. 3, 4, 5 & 6 illustrates a side view, a front view, a back view, and a top view of housing 102 respectively in accordance with an embodiment of the invention.

Housing 102 includes a left surface 202-1, a right surface 202-2, a top surface 204-1, a bottom surface 204-2, a back surface 206, a glass surface 208, a plurality of side edges 210(1-8), four angles 212(1-4), two guide rails 214(1-2), ten end caps 216(1-10), two profile sensor mounts 218(1-2), an aluminum sensor mount 220, four angles for cover left/right 222(1-4), and four angles for cover top/bottom 224(1-4).

Four angles 212 (1-4) and four angles for cover left/right 222 (1-4) and four angles for cover top/bottom 224 (1-4) provide stability to housing 102.

Guide rails 214(1-2) assists in holding glass surface 208 in position. Further, as guide rails 214(1-2) are configured to be moved into direction of glass cover 208 and backwards, accordingly glass covers with different thicknesses can be used.

Left surface 202-1, right surface 202-2, top surface 204-1, bottom surface 204-2, and back surface 206 are affixed to respective side edges of the plurality of side edges 210(1-8) to form the rectangular cuboid shape. Ten end caps 216 (1-10) are used to cover gaps/openings that are left open as left surface 202-1, right surface 202-2, top surface 204-1, bottom surface 204-2 and back surface 206 are affixed to respective side edges. Such gaps/openings allow dirt and/or water to sip into housing 102.

In an embodiment, two profile sensor mounts 218 (1-2) are attached to inner walls of housing 102. Aluminum sensor mount 220 is deployed on top of two profile sensor mounts 218 (1-2). Photo detector 104 is put between two profile sensor mounts 218 (1-2).

In an embodiment, each surface of housing 102 is made up of aluminum. Any other suitable material can be used for the surfaces of housing 102. Each surface includes an external surface and an inner surface. The inner surface of each surface includes a broad contact surface to avoid tilting of photo detector 104 mounted inside housing 102. Glass surface 208 is surrounded with a supporting surface using a foam rubber tape. The supporting surface protects the glass from slipping. In an embodiment, glass surface 208 is a low-iron, solar glass with a light transmission in the range of 380-780 nanometer (nm). Glass surface 208 is 3 millimeter (mm) thick with the light transmission of 91.7% in the range of 380-780 nm. Glass surface 208 transmits illumination collected from an external ambience of housing 102 to one or more inner surfaces corresponding to left surface 202-1, right surface 202-2, top surface 204-1, bottom surface 204-2, and back surface 206. The one or more inner surfaces corresponding to left surface 202-1, right surface 202-2, top surface 204-1, bottom surface 204-2, and back surface 206 generates plurality of reflections of scattered illumination inside housing 102.

A plane white sheet is positioned on the inner surface of glass surface 208. The plane white sheet is a commercially available white copy printing paper of A4 80 grams per square meter (gsm) quality. The plane white sheet homogenously scatters illumination collected from the external ambience of housing 102 into the one or more inner surfaces corresponding to left surface 202-1, right surface 202-2, top surface 204-1, bottom surface 204-2, and back surface 206.

Figure 7:
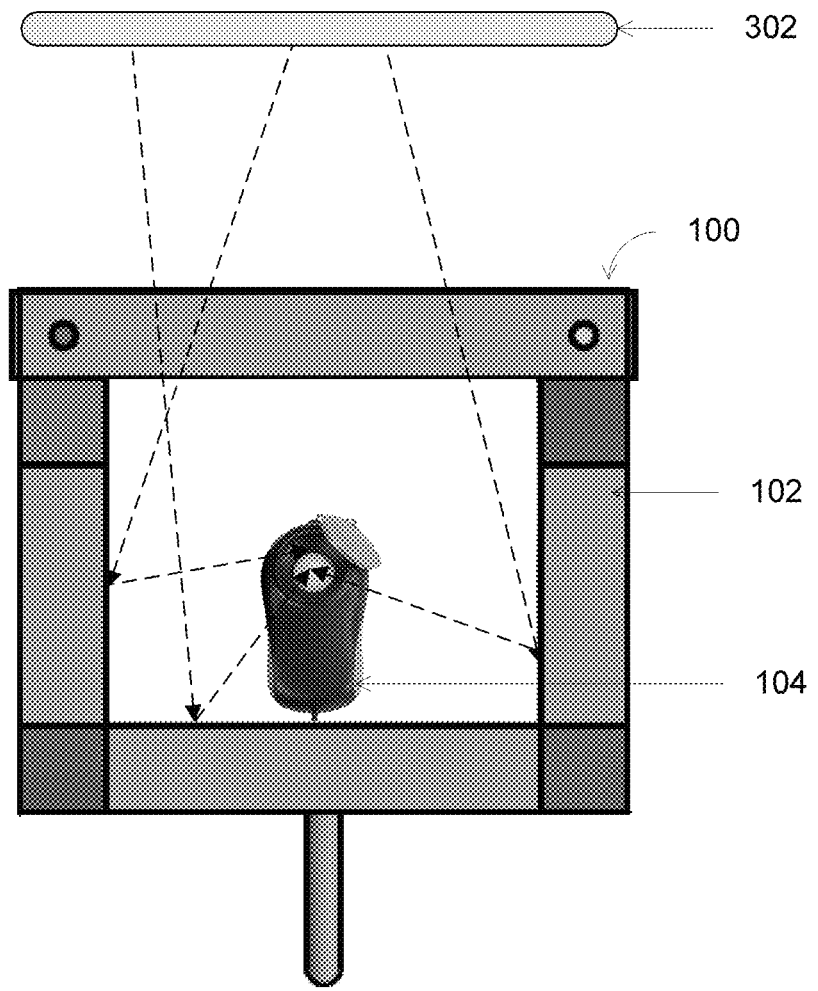
FIG. 7 illustrates scattering of illuminance within the housing of the illuminance measuring module in accordance with an embodiment of the invention.

FIG. 7 illustrates scattering of illuminance within housing 102 of illuminance measuring module 100 in accordance with an embodiment of the invention. Photo detector 104 mounted inside housing 102 measures scattered illumination diffused from the one or more inner surfaces corresponding to left surface 202-1, right surface 202-2, top surface 204-1, bottom surface 204-2, and back surface 206. The illuminance from the external ambience such as, but not limited to, the illuminance from a light source 302, passes through glass surface 208 and then the illuminance is distributed homogeneously by the plane white sheet behind glass surface 208. The scattered illuminance is reflected several times from the one or more inner surfaces corresponding to left surface 202-1, right surface 202-2, top surface 204-1, bottom surface 204-2, and back surface 206 of housing 102.

Various embodiments of the invention provide an illumination measuring module which allows a photo detector to measure illuminance accurately even under direct sunlight. The illumination measuring module can be used in various field such as construction, inspection, photography, greenhouse gardening and measurement of decrease of transmission due to pollution.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification is to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A reflective light collecting enclosure for a light meter, comprising:
   a housing molded with a plurality of reflective surfaces, wherein each reflective surface of the plurality of reflective surfaces is affixed with respective side edges of the plurality of reflective surfaces to form a predetermined shape, wherein each reflective surface comprises an external surface and an inner reflective surface;

a glass surface configured to transmit illumination collected from an external ambience of the housing to the plurality of reflective surfaces;

a planar white sheet positioned on an inner surface of the glass surface, wherein the planar white sheet homogenously scatters illumination collected from the external ambience of the housing into onto the plurality of reflective surfaces of the housing; and a light meter mounted inside the housing, wherein the light meter measures scattered illumination reflected by the plurality of reflective surfaces to identify precise measurements of incident illumination under external ambience.

2. The reflective light collecting enclosure for a light meter of claim 1, wherein the predetermined shape of the housing is a polyhedron.

3. The reflective light collecting enclosure for a light meter of illumination measuring module as claimed in claim 1, wherein the inner reflective surface of each reflective surface comprises a broad contact surface to avoid tilting of the light meter mounted inside the housing.

4. The reflective light collecting enclosure for a light meter of claim 1, wherein the plurality of reflective surfaces generate a plurality of reflections of the scattered illumination inside the housing.

5. The reflective light collecting enclosure for a light meter of claim 1, wherein the glass surface is surrounded with a supporting surface using a foam rubber tape.

6. The reflective light collecting enclosure for a light meter of claim 1, further comprising a glass base to provide a secure arrangement of the reflective light collecting enclosure for measuring illumination collected from the external ambience of the housing.

7. The reflective light collecting enclosure for a light meter of claim 6, wherein the glass base comprises one of a coated glass pane or an uncoated glass pane positioned in one of an upright angle or a tilted angle.

* * * * *